US006688512B2

(12) United States Patent
Trask

(10) Patent No.: US 6,688,512 B2
(45) Date of Patent: Feb. 10, 2004

(54) APPARATUS AND METHOD FOR FRICTION WELDING

(75) Inventor: Richard D. Trask, Simsbury, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 10/022,404

(22) Filed: Dec. 20, 2001

(65) Prior Publication Data
US 2003/0201305 A1 Oct. 30, 2003

(51) Int. Cl.[7] ................................................ B23K 20/12
(52) U.S. Cl. ...................................... 228/112.1; 228/2.1
(58) Field of Search ........................... 228/112.1, 114.5, 228/2.1, 2.3; 156/73.5, 73.1

(56) References Cited

U.S. PATENT DOCUMENTS

| 4,884,736 A | 12/1989 | Goddard |
| RE35,664 E | 11/1997 | Searle |
| 5,697,545 A | 12/1997 | Jennings et al. |
| 6,095,402 A | 8/2000 | Brownell et al. |
| 6,199,744 B1 | 3/2001 | Schneefeld et al. |
| 6,199,745 B1 * | 3/2001 | Campbell et al. ........ 228/112.1 |
| 6,219,916 B1 | 4/2001 | Walker et al. |
| 6,237,834 B1 | 5/2001 | Mahoney et al. |
| 6,264,088 B1 | 7/2001 | Larsson |

* cited by examiner

Primary Examiner—M. Alexandra Elve
Assistant Examiner—Len Tran
(74) Attorney, Agent, or Firm—Brian J. Hamilla

(57) ABSTRACT

An apparatus for friction welding a workpiece to a substrate, comprising an actuator producing a linear oscillating motion, a platform for supporting the workpiece, and a slide mechanism between the actuator and the platform. The slide mechanism converts the linear oscillating motion of the actuator into an arcuate oscillating motion of the platform. The slide could comprise a base and a guide engaging the platform.

20 Claims, 3 Drawing Sheets

APPARATUS AND METHOD FOR FRICTION WELDING

TECHNICAL FIELD

The present invention relates to an apparatus and method for friction welding. Specifically, the present invention relates to an apparatus and method for friction welding that produces an arcuate oscillating motion.

BACKGROUND OF THE INVENTION

In general terms, a gas turbine engine has a compressor section, a combustion section and a turbine section. Air travels axially through the engine within an annular flow path. First, the air enters the compressor section. The compressor section pressurizes the air. The air then travels to the combustion section. The combustion section introduces fuel to the air and ignites the mixture. The air then travels to the turbine section. The turbine section extracts energy from the exhaust to drive the compressor. The air then exits the engine as thrust.

The compressor and turbine sections each include one or more bladed rotor assemblies. A rotor assembly includes a disk/rotor and a plurality of blades secured the outer diameter of the disk. Several techniques exist to secure the blades to the disk.

One such technique uses complementary shaped retention features on the disk and the blades. Specifically, the disk includes an arrangement of slots, each receiving a dovetail or fir tree arrangement on the root of the blade. This technique can have issues with manufacturing (e.g. the machining of complex slots in the disk) and weight.

Another technique involves the bonding or welding of the blades to the disk. Bonding the blades to the disk produces an integrally bladed rotor (IBR) assembly. This technique is preferred when considering possible weight savings. A rotor assembly using the aforementioned slot/dovetail arrangement will weigh more than an IBR since the IBR does not require blade platforms or roots.

One method of producing an IBR is friction welding. Friction welding utilizes complementary interfacing surfaces of the blade and the disk. The friction welding machine rubs the interfacing surfaces of the blade and the disk together in an oscillating pattern. The friction created at the interface generates heat. The heat produces a molten, preferably plastic, state to the material at the interfacing surfaces.

As the parts rub, the machine applies a compressive force to increase pressure at the interface. This forge load causes some of the molten material to exit the interface. This flash flow of molten material from the interface by the forge load causes a gradual decrease in part thickness (in the forge direction, i.e. perpendicular to the interface).

At a desired thickness, the machine terminates the rubbing of the blade and disk. As a result, flash flow will cease. In addition, the interfacing surfaces of the blade and the disk will cool. Upon cooling, the interface reverts to a solid structure. The parts together are now joined together as one piece.

Conventional friction welding machines utilize a linear oscillating motion when rubbing the blade and the disk together. Most conventional linear friction welding machines hold the blade with the airfoil chord aligned with the axis of oscillation. The phrase "airfoil chord" refers the straight line between the ends of the mean camber line of an airfoil. The phrase "mean camber line" refers the locus of points equidistant from the upper and lower surfaces of an airfoil.

This alignment has proven successful for blades with low camber. The term "camber" refers to the distance between the airfoil chord and the mean camber line.

A common problem encountered by conventional linear friction welding machines is notch effect. As the blade moves in relation to the disk, an overhang occurs at either end of the oscillation path. The overhang has more direct exposure to the atmosphere than the remainder of the interface between the parts. As a result, the overhang is cooler than the remainder of the interface. In fact, the bond interface at the overhang prematurely cools, causing notches.

The solution to the aforementioned notch effect is to provide extra material or sacrificial tips to the blade.

As the camber of the airfoil deepens, however, overhang also occurs along the sides of the blade where the edges of the two parts are not parallel to the linear axis of oscillation. An airfoil with "deep" camber has leading and trailing edges extending at an angle to the camber line greater than a low, or shallow, camber airfoil.

The use of the aforementioned sacrificial material along the sides of the blade is not practical with deep camber airfoils. The present invention, however, provides an effective solution.

DISCLOSURE OF THE INVENTION

It is an object of the present invention to provide an improved friction welding method and apparatus.

It is a further object of the present invention to provide a friction welding method and apparatus compatible with curved workpieces.

It is a further object of the present invention to provide a friction welding method and apparatus compatible with blades having camber.

It is a further object of the present invention to provide a friction welding method and apparatus compatible with blades having deep camber.

It is a further object of the present invention to provide a friction welding method and apparatus that oscillates in a path that better conforms to the mean camber line of the airfoil section of the blade.

It is a further object of the present invention to provide a friction welding method and apparatus that provides uniform flash flow.

It is a further object of the present invention to provide a friction welding method and apparatus that reduces notch effect.

It is a further object of the present invention to provide a friction welding method and apparatus that exhibits reduced machine loading.

These and other objects of the present invention are achieved in one aspect by an apparatus for friction welding a workpiece to a substrate, comprising: an actuator producing a linear oscillating motion; a platform for supporting the workpiece; and a slide mechanism between the actuator and the platform. The slide mechanism converts the linear oscillating motion of the actuator into an arcuate oscillating motion of the platform so the platform can move the workpiece in the arcuate oscillating motion against the substrate.

These and other objects of the present invention are achieved in another aspect by a slide mechanism for a friction welding apparatus having an actuator and a platform for supporting a workpiece. The slide mechanism comprises: a base; and a guide engaging the platform and converting a linear oscillating motion of the actuator into an arcuate oscillating motion of the platform.

These and other objects of the present invention are achieved in another aspect by a method of friction welding a curved workpiece, having a leading edge and a trailing edge, to a substrate. The method comprises the steps of: providing an actuator which generates a linear oscillating motion; converting the linear oscillating motion of the actuator into an arcuate oscillating motion of the workpiece; and contacting the substrate with the workpiece with a force sufficient to bond the workpiece to the substrate.

BRIEF DESCRIPTION OF THE DRAWINGS

Other uses and advantages of the present invention will become apparent to those skilled in the art upon reference to the specification and the drawings, in which.

BEST MODE FOR CARRYING OUT THE INVENTION

Figure 1:
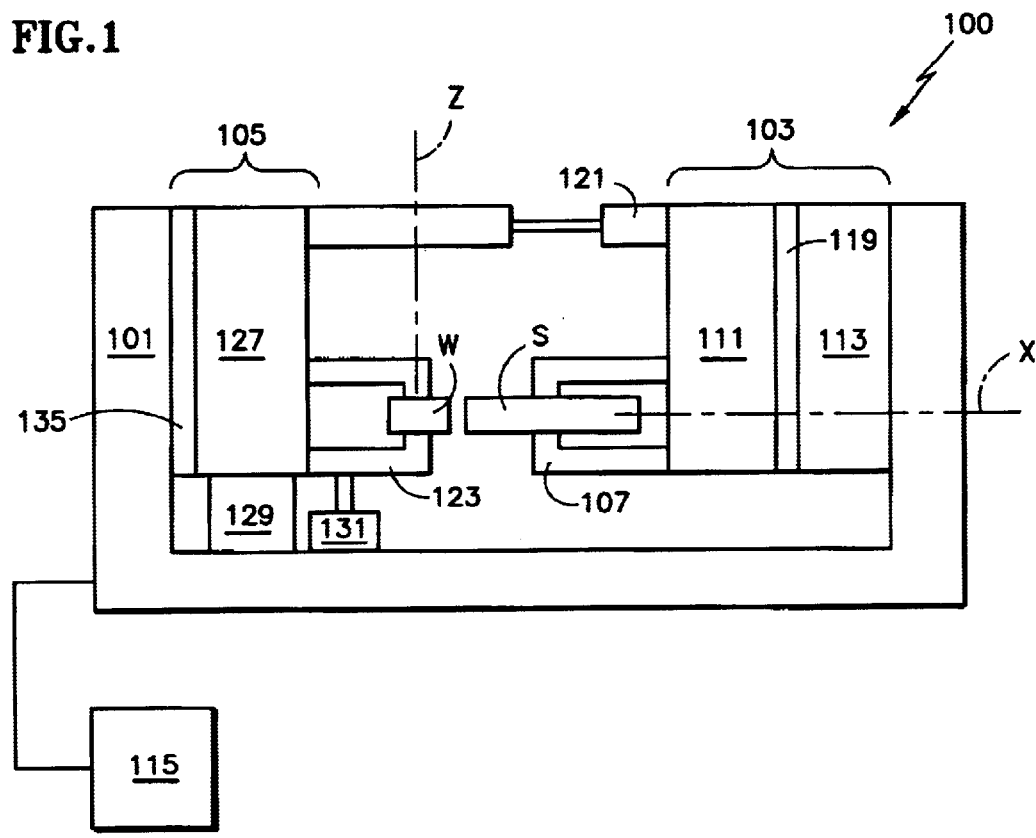
FIG. 1 is a schematic of a linear friction welding machine.
Figure 5:
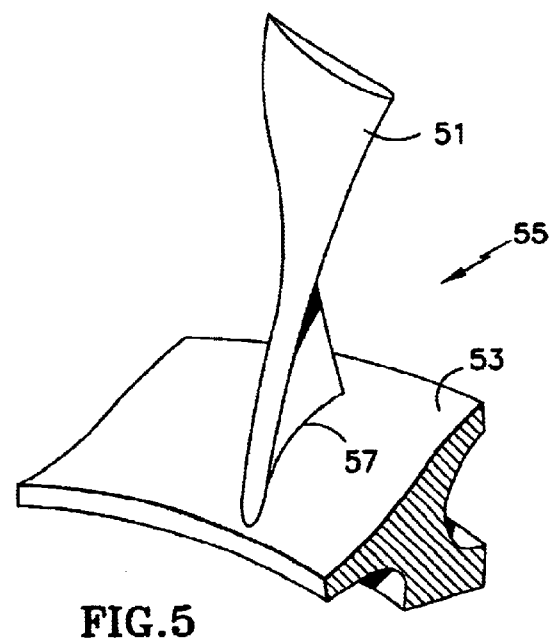
FIG. 5 is a perspective view of a section of a rotor assembly having a blade with an airfoil section exhibiting camber.

FIG. 1 provides a schematic of a linear friction welding (LFW) machine 100. The LFW machine 100 bonds a workpiece W to a substrate S. A typical manufacturer of such LFW machine 100 includes MTS Systems Corporation of Eden Prairie, Minn. Although capable of accommodating any workpiece W and substrate S, FIG. 5 displays the preferred application of the LFW machine 100. The LFW machine 100 preferably bonds a blade 51 to a disk/rotor 53 to produce a rotor assembly 55 for a gas turbine engine (not shown).

The LFW machine 100 includes a frame 101 that supports a first section 103 and a second section 105. The frame 101 could have any suitable arrangement and could be made from any suitable material.

The first section 103 of the machine 100 corresponds to the substrate S. The first section 103 includes a holder 107 for the substrate S, a platform 111 supporting the holder 107, and an actuator 113 to drive the platform 111. The holder 107 and platform 111 could have any suitable arrangement and could be made from any suitable material.

The actuator 113 preferably drives the platform 111 towards the workpiece W along a forging axis X. The actuator 113 should have the capability of providing sufficient force to the substrate S for compression against the workpiece W. The actuator, preferably hydraulically operated, receives commands from a processor 115. The processor 115 receives signals from sensors 119, 121. The first sensor 119 provides the processor 115 with data regarding compressive force. The second sensor 121 provides the processor 115 with data regarding the position of the substrate S along the forging axis X.

The second section 105 of the machine 100 corresponds to the workpiece W. Similar to the first section 103, the second section 105 includes a holder 123 for the workpiece W, a platform 127 supporting the holder 123, and an actuator 129 to drive the platform 127. The holder 123 and platform 127 could have any suitable arrangement and could be made from any suitable material.

The actuator 129 preferably drives the platform 127 transverse to the substrate S along a linear oscillation path Z. The actuator 129 should have the capability of providing sufficient force to rub the workpiece W against the substrate S when under compression by the actuator 113 of the first section 103. The actuator, also preferably hydraulically operated, receives commands from the processor 115. The processor 115 receives a signal from a sensor 131. The sensor 131 provides the processor 115 with data regarding the position of the workpiece W along the oscillation path Z.

Differently than the first section 103, the second section 105 includes a slide mechanism 135 secured to the frame 101 using known techniques. The slide mechanism 135 guides the platform 127 along a linear oscillating path relative to the frame 101 when driven by the actuator 129.

Figure 2:
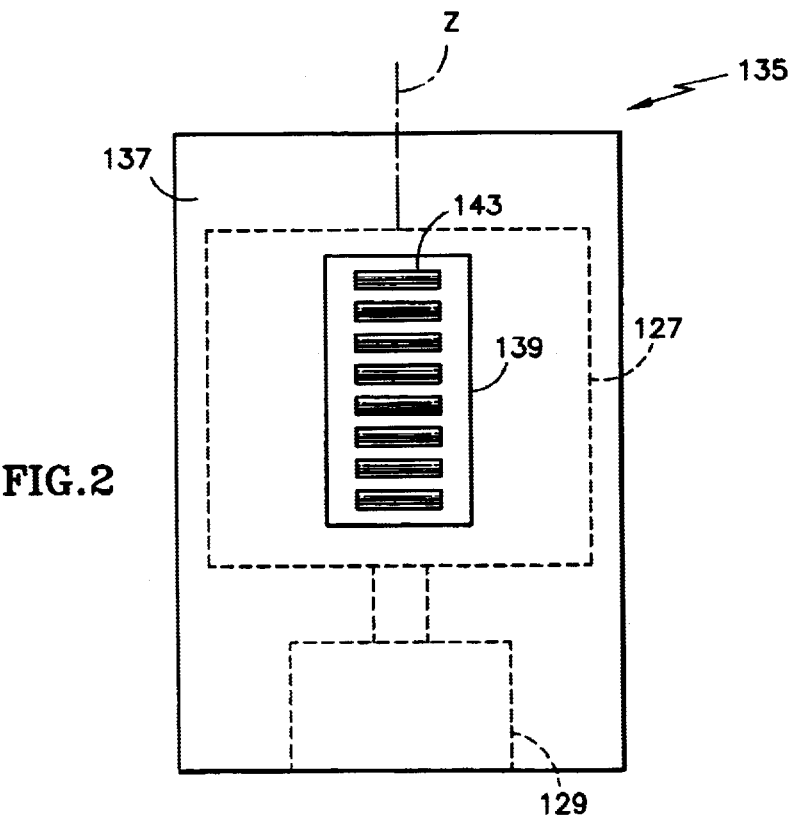
FIG. 2 is an elevational view of one component of the linear friction welding machine of FIG. 1.

FIG. 2 provides an elevational view of the slide mechanism 135. The figure also shows, in phantom line, the location of the platform 127 and the actuator 129 relative to the slide mechanism 135.

The slide mechanism 135 includes a base 137 secured to the frame 101. The base 137 includes at least one channel 139 therein. The channel 139 receives a complementary shaped portion (not shown) of the platform 127. The complementary shaped portion of the platform 127 is smaller than the channel 139 along the oscillation path Z to allow movement of the platform 127 by the actuator 129.

To assist movement of the platform 127, the bottom of the channel 139 includes a plurality of bearings 143. The bearings 143 are typically cylindrical roller bearings that allow movement of the platform along the oscillation path Z.

Figure 3:
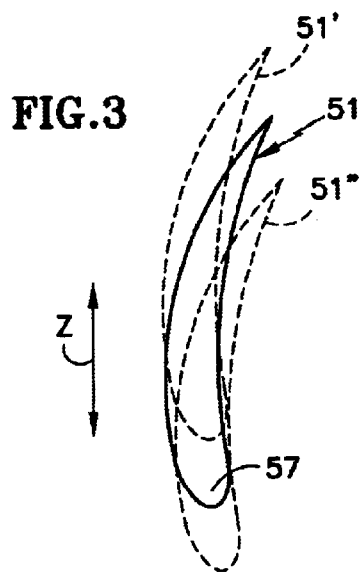
FIG. 3 demonstrates the linear oscillating path of the workpiece produced by the linear friction welding machine of FIG. 1.
Figure 4:
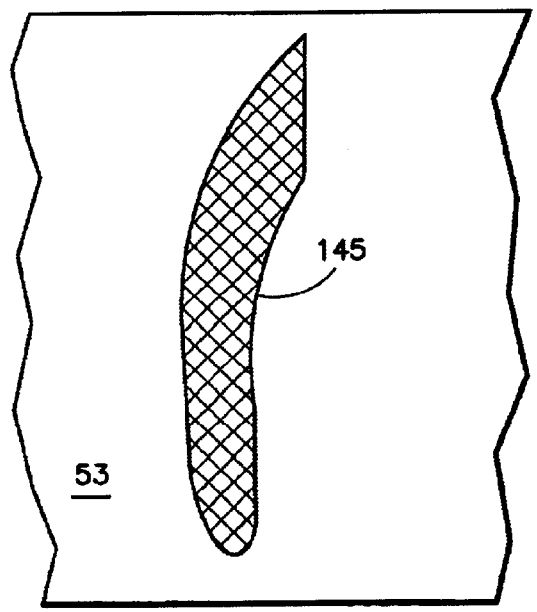
FIG. 4 demonstrates the area on the substrate contacted by the workpiece during the oscillation of the linear friction welding machine of FIG. 1.

FIGS. 3 and 4 highlight the drawback of using the aforementioned LFW machine 100 with a curved workpiece, such as the blade 51. As discussed above, the LFW machine 100 typically oscillates the blade 51 along the airfoil chord at an interfacing surface 57 of the blade 51. In other words, the oscillation path Z typically parallels the airfoil chord at the interfacing surface 57 of the blade 51.

FIG. 3 shows the possible range of movement of the blade 51. The blade 51 can travel on a linear path in the oscillation path Z between one extreme 51' and another extreme 51". As seen in FIG. 4, driving the curved blade 51 along the airfoil chord creates a significant contact area 145 on the disk 53. Due to the size of the contact area 145, the blade 51 tends to lose material from the leading and trailing edges. The conventional solution adds extra material to the leading and trailing edges of such blades 51 to accommodate increased flash flow and notch effects. This solution, however, is not practical with deep camber airfoils.

The present invention uses a different technique. Generally speaking, the present invention alters the oscillation path of the machine from a linear movement oriented relative to the airfoil chord of the blade 51 to an arc. Preferably, the arc is a regular arc. In addition, the arc should more closely resemble the mean camber line of the airfoil of the blade than the linear oscillation of conventional techniques.

Figure 6:
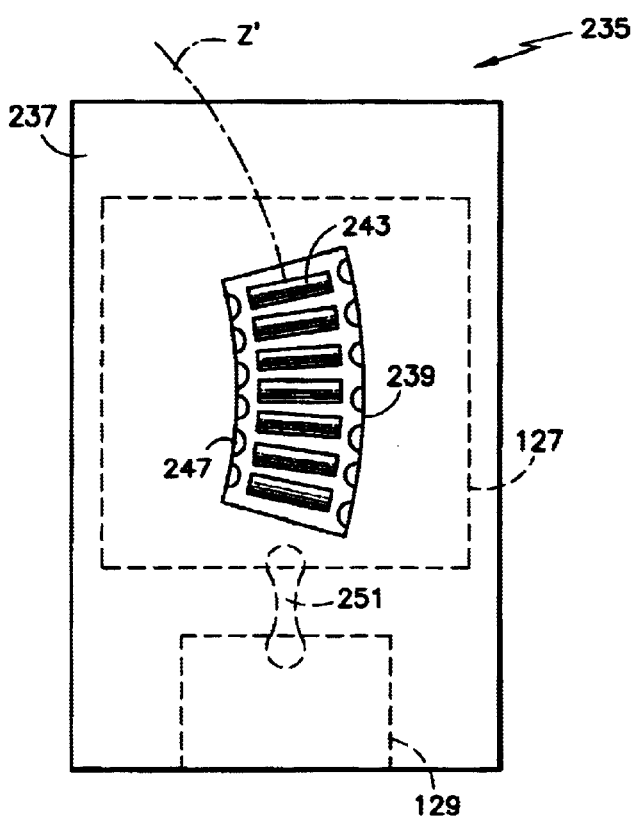
FIG. 6 is an elevational view of a component of one embodiment of a friction welding machine of the present invention.

FIG. 6 demonstrates how the present invention can be implemented in the aforementioned LFW machine 100. The present invention substitutes the aforementioned slide mechanism 135 with an improved slide mechanism 235. The slide mechanism 235 guides the platform 127 when driven by the actuator 129.

The slide mechanism 235 includes a base 237 secured to the frame 101. The base 237 includes at least one channel 239 therein. Differently than channel 139, channel 239 has the shape of a regular arc. In other words, the curved sides of the channel 239 share a common arc center (not shown). Accordingly, the width of the channel 239 remains constant along a radial line to the arc center.

The shape of the channel 239 defines an arcuate oscillation path Z'. In other words, the movement of the blade 51 across the disk 53 is a rotation about an axis transverse to the surface of the disk 53 and passing through the common arc center. Preferably, the arcuate oscillation path Z' conforms to the mean camber line of the airfoil section of the blade 51 better than the conventional linear oscillation path.

The channel 239 receives a complementary shaped portion (not shown) of the platform 127 of the second section 105 of the machine 100. The complementary shaped portion of the platform 127 is preferably arcuate, and has a constant width along a radial line to the arc center across the entire length. The complementary shaped portion of the platform 127 is smaller than the channel 239 along the oscillation path Z' to allow movement of the platform 127 by the actuator 129.

To assist movement of the platform 127, the bottom of the channel 239 includes a plurality of first bearings 243 similar to the bearings 143 in the slide mechanism 135. The first bearings 243 could be cylindrical roller bearings arranged along the arcuate path of the channel 239. However, the present invention could use other suitable bearing types.

The channel also includes a plurality of second bearings 247 along the side walls. The second bearings 247 could also be cylindrical roller bearings extending transversely relative to the first bearings 243. However, the present invention could utilize any suitable bearing type.

The first and second bearings 243, 247 allow movement of the platform 127 along the arcuate oscillation path Z'. Although shown in the figures as discrete sets of bearings, the present invention could utilize any arrangement that allows arcuate movement of the platform 127 when driven by the actuator 129. For example, the curved side walls could have a hydrostatic-type bearing surface (not shown) for shallow camber blades.

Since the platform 127 moves along the arcuate oscillating path Z' while driven by the stationary actuator 129, the present invention preferably uses a conventional pivotable coupling 251. The coupling 251 transmits the motive force from the actuator to the platform while allowing the platform to rotate relative to the actuator 129.

Figure 7:
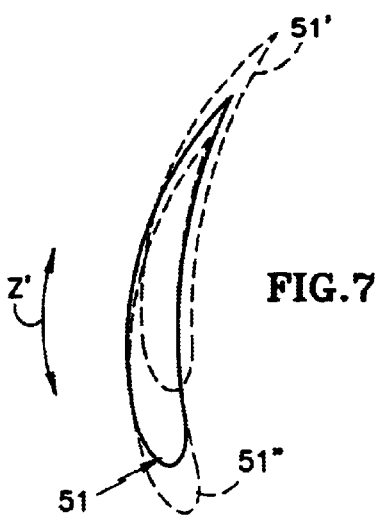
FIG. 7 demonstrates the arcuate oscillating path of the workpiece produced by the friction welding machine of the present invention.
Figure 8:
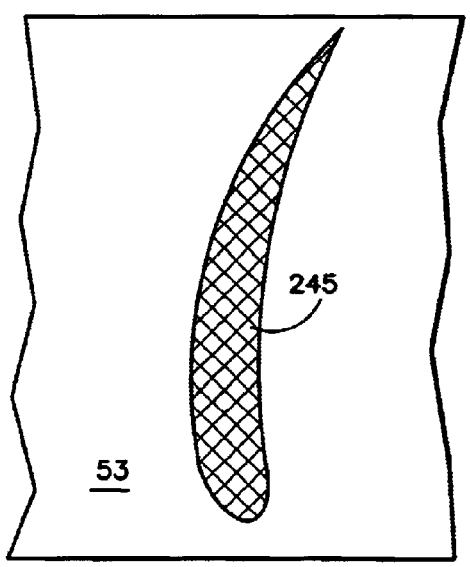
FIG. 8 demonstrates the area on the substrate contacted by the workpiece during the oscillation of the friction welding machine of the present invention.

FIGS. 7 and 8 highlight the benefit of using the slide mechanism 235 in the LFW machine 100. As discussed above, the LFW machine 100 typically oscillates the blade 51 generally along the mean chord line of the airfoil of the blade 51. In other words, the oscillation path Z' follows the shape of the airfoil of the blade 51.

FIG. 7 shows the possible range of movement of the blade 51. The blade 51 can travel on the arcuate oscillation path Z' between one extreme 51' and another extreme 51". As seen in FIG. 8, driving the curved blade 51 along the mean chord line creates a contact area 245 on the disk 53. The size of this contact area 245 is smaller than the contact area 145 produced by linear oscillation of the blade 51. The specific reduction in contact area will vary with the actual shape of the product. Preferably, the slide mechanism 235 is designed with an arc that can accommodate several part numbers (rather than using a discrete slide mechanism 235 for each part).

The reduced contact area 245 produces less material sweep off from the leading and trailing edges of the blade 51 than conventional linear oscillation of the blade 51. This results in a reduction in the amount of extra material required at the leading and trailing edges of the blade 51 due to a reduction in flash flow and notch effect.

The reduced contact area 245 also lowers the frictional load on the actuator 129 in the oscillating path. In addition, the reduced contact area 245 also lowers the forge pressure required from the actuator 121 for the same forge load in the linear oscillating motion.

Finally, the reduced contact area 245 leaves less residual material that must be removed to produce the finished part. In addition, the flash flow produced with the present invention is more uniform around the interface between the blade 51 and the disk 53.

The present invention also reduces overhung areas. Reduction occurs because the width of the overhung area in the present invention equals the narrow dimension of the blade.

By oscillating the blade in this arrangement, the machine also becomes easier to control. The machine exhibits lower forge displacement variation (i.e. noise) due to a reduced variation (sinusoidal) of actual forge load at the interface. Lower noise levels obviate the need for band pass filters that can introduce delays to the observable signal.

In addition to the aforementioned slide mechanism 235, other techniques to impart an arcuate oscillating motion to the blade 51 are possible. For example, a mechanism (not shown) to rotate the holder 123 during linear oscillation is possible. Also, a mechanism (not shown) to impart linear motion to the platform 123 in a second direction (transverse to the first direction) is possible.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An apparatus for friction welding a workpiece to a substrate, comprising:
    an actuator producing a linear oscillating motion;
    a platform for supporting the workpiece; and
    a slide mechanism between said actuator and said platform, said slide mechanism converting said linear oscillating motion of said actuator into an arcuate oscillating motion of said platform;
    whereby the platform can move the workpiece in said arcuate oscillating motion against the substrate.

2. The apparatus as recited in claim 1, wherein said actuator is a linear actuator.

3. The apparatus as recited in claim 1, wherein said arcuate oscillating motion follows a regular arc.

4. The apparatus as recited in claim 3, wherein the workpiece is an airfoil having a mean camber line and said arcuate oscillating motion generally follows said mean camber line.

5. The apparatus as recited in claim 1, wherein said slide mechanism comprises:

a base; and a guide engaging said platform and converting said linear oscillating motion of said actuator into said arcuate oscillating motion of said platform.

6. The apparatus as recited in claim 5, wherein said guide comprises an arcuate channel in said base.

7. The apparatus as recited in claim 6, wherein said guide further comprises a plurality of bearings in said channel.

8. The apparatus as recited in claim 6, wherein the workpiece is an airfoil having a mean camber line, and said arcuate channel generally follows the mean camber line.

9. A linear friction welding machine having an actuator, a platform and a slide mechanism, wherein the improvement comprises said slide mechanism converting a linear oscillating motion of said actuator into an arcuate oscillating motion of said platform.

10. A method of friction welding a curved workpiece, having a leading edge and a trailing edge, to a substrate, comprising the steps of:

providing an actuator which generates a linear oscillating motion;

converting said linear oscillating motion of said actuator into an arcuate oscillating motion of said workpiece; and contacting said substrate with said workpiece with a force sufficient to bond said workpiece to said substrate.

11. The method as recited in claim 10, wherein said actuator is a linear actuator.

12. The method as recited in claim 10, wherein said arcuate oscillating motion follows a regular arc.

13. The method as recited in claim 10, wherein the workpiece is an airfoil having a mean camber line, and said arcuate oscillating motion generally follows said mean camber line.

14. The method as recited in claim 10, wherein said converting step comprises the step of providing a slide mechanism between said actuator and said workpiece, said slide mechanism converting said linear oscillating motion of said actuator into an arcuate oscillating motion of said workpiece.

15. The method as recited in claim 14, wherein said slide mechanism comprises:

a base; and a guide engaging said workpiece and converting said linear oscillating motion of said actuator into said arcuate oscillating motion of said workpiece.

16. The method as recited in claim 15, wherein said guide comprises an arcuate channel in said base.

17. An apparatus for friction welding a workpiece to a substrate, comprising:

an actuator producing a linear oscillating motion;

a platform for supporting the workpiece; and a slide mechanism between said actuator and said platform, said slide mechanism comprising a base and an arcuate channel in said base, said slide mechanism engaging said platform and converting said linear oscillating motion of said actuator into an arcuate oscillating motion of said platform;

whereby the platform can move the workpiece in said arcuate oscillating motion against the substrate.

18. The apparatus as recited in claim 17, wherein said guide further comprises a plurality of bearings in said channel.

19. The apparatus as recited in claim 17, wherein the workpiece is an airfoil having a mean camber line, and said arcuate channel generally follows the mean camber line.

20. A method of friction welding a curved workpiece, having a leading edge and a trailing edge, to a substrate, comprising the steps of:

providing an actuator which generates a linear oscillating motion;

providing a slide mechanism between said actuator and said workpiece, said slide mechanism comprising a base and an arcuate channel in said base, said slide mechanism engaging said workpiece and converting said linear oscillating motion of said actuator into an arcuate oscillating motion of said workpiece; and contacting said substrate with said workpiece with a force sufficient to bond said workpiece to said substrate.

* * * * *